United States Patent
Hanks

(10) Patent No.: US 7,330,326 B2
(45) Date of Patent: Feb. 12, 2008

(54) RECORDABLE DISK ROTATIONAL SPEED ERROR CORRECTION CIRCUIT

(75) Inventor: Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 10/796,228

(22) Filed: Mar. 9, 2004

(65) Prior Publication Data

US 2005/0201234 A1    Sep. 15, 2005

(51) Int. Cl.
G11B 15/46 (2006.01)

(52) U.S. Cl. .............. 360/73.03; 369/47.38; 369/53.43; 250/231.13

(58) Field of Classification Search ......... 369/47.38, 369/53.43; 360/73.03; 318/684; 250/231.13, 250/231.14; G11B 5/09, 5/52, 19/247, 15/46; G05B 11/12; G01D 5/34
See application file for complete search history.

(56) References Cited

U.S. PATENT DOCUMENTS

| | | | | |
|---|---|---|---|---|
| 3,579,268 | A | * | 5/1971 | Steiger .................. 708/809 |
| 4,008,425 | A | * | 2/1977 | Dickey .................. 318/799 |
| 4,785,181 | A | * | 11/1988 | Kimizuka et al. ....... 250/237 G |
| 4,843,288 | A | * | 6/1989 | Volz et al. .................. 318/599 |
| 5,202,842 | A | * | 4/1993 | Suzuki .................. 702/151 |
| 5,402,280 | A | * | 3/1995 | Supino .................. 360/77.04 |
| 5,774,299 | A | * | 6/1998 | Baum et al. ............. 360/77.08 |
| 6,052,465 | A | * | 4/2000 | Gotoh et al. ............. 369/53.21 |
| 6,232,594 | B1 | * | 5/2001 | Eccher et al. .......... 250/231.14 |
| 6,304,825 | B1 | * | 10/2001 | Nowak et al. ................ 702/94 |
| 6,415,237 | B1 | * | 7/2002 | Moizio et al. ............. 702/104 |
| 6,456,452 | B1 | | 9/2002 | Hobson et al. |
| 6,611,391 | B1 | | 8/2003 | Murphy et al. |
| 6,639,207 | B2 | * | 10/2003 | Yamamoto et al. .... 250/231.14 |
| 6,646,964 | B1 | | 11/2003 | Abramovitch et al. |
| 7,006,321 | B2 | * | 2/2006 | Kisaka .................. 360/73.03 |
| 7,060,969 | B2 | * | 6/2006 | Uchiyama et al. ..... 250/231.16 |

FOREIGN PATENT DOCUMENTS

JP    61-221808    * 2/1986

OTHER PUBLICATIONS

European Search Report dated Oct. 12, 2006 for EP Patent App. No. 04 01 9951, (3 pgs).
Bodson, M et al: "Harmonic generation in adaptive feedforward cancellation schemes" Proceedings of the Conf. on Decision and Control, Tuscon, Dec. 16, 1992, pp. 1261-1266, ISBN: 0-7803-0872-7.
Sastry, S et al: "Adaptive Control: Stability, Convergence, and Robustness" 1989, Prentice Hall, Inc. New Jersey, pp. 104-105; fig. 3.1.

(Continued)

*Primary Examiner*—A M Psitos

(57) ABSTRACT

An error correction circuit for determining an error in rotational speed of a recordable disk of a disk drive includes a sinusoidal error calculation portion adapted to generate a true oscillation error signal, and a summation portion adapted to combine the true oscillation error with a spindle error signal to generate a total error signal. The sinusoidal error calculation portion is adapted to generate a new true oscillation error based on the total error signal.

37 Claims, 3 Drawing Sheets

OTHER PUBLICATIONS

Seborg, D et al: "Process Dynamics and Control", 1989, John Wiley & Sons, Inc. USA, 186389, XP0022402865, pages.

Glover, J R Jr: "Adaptive noise canceling applied to sinusoidal interferences" IEEE Transactions on Acoustics, Speech and Signal Processing USA, vol. ASSP-25, No. 6, Dec. 1977, pp. 484-491, XP002402297, ISSN: 0096-3518.

Sacks, A H et al: Advanced methods for repeatable runout compensation [disc drives] IEEE Transactions on Magnetics USA, vol. 31, No. 2, Mar. 1995, pp. 1031-1036, XP002402298, ISSN: 0018-9464.

Bodson, M et al: "Rejection of disturbances with a large sinusoidal component of unknown frequency", Proceedings of the Spie—The International Society for Optical Engineering SPIE-INT. Soc. Opt. Eng USA, vol. 2715, 1996, pp. 64-75, XP002402299, ISSN: 0277-786X.

Jieng-Jang, Liu et al: "Frequency adaptive control technique for rejecting periodic runout", Control Engineering Practice Elsevier UK, vol. 12, No. 1, Jan 2004, pp. 31-40, XP002402300, ISSN: 0967-0661.

Liu, J-J et al: "Stability of the frequency adaptive control technique and its application to compact disk drives", Control Engineering Practice, Pergamon Press, Oxford, GB, vol. 13, No. 5, May 2005, pp. 629-639, XP004730217, ISSN: 0967-0661.

* cited by examiner

RECORDABLE DISK ROTATIONAL SPEED ERROR CORRECTION CIRCUIT

BACKGROUND

Some disk drive devices for computer systems have a recordable disk driven by a spindle motor. To conduct read and write operations, the recordable disk is rotated at a predetermined rotational speed, and a reading or writing element reads or writes information to or from the recordable disk. To determine, monitor, and adjust the speed of the recordable disk, these disk drives may utilize an encoder wheel configured to rotate at the same speed as the recordable disk.

The encoder wheel may be a disk-shaped device that includes a series of reflective and non-reflective regions alternatively disposed circumferentially around the encoder wheel. A directed light source shines light on the encoder wheel as it rotates with the recordable disk. When the light shines on the reflective regions, a relatively great amount of the light is reflected back to a photodetector. Conversely, when the light shines on the non-reflective regions, a relatively low amount of light (if any) is reflected back to the photodetector. By using the photodetector to determine when the light is reflecting off of a reflective region or is reflecting off of a non-reflective region, the actual rotational speed of the encoder wheel can be determined by measuring the elapsed time of reflective and non-reflective regions of the encoder wheel, respectively, passing by the photodetector. Because the encoder wheel is configured to rotate at the same speed as the recordable disk, it is assumed that the determined rotational speed of the decoder is the same as the actual rotational speed of the recordable disk. The determined rotational speed of the decoder can be compared to a predetermined desired rotational speed of the recordable disk, and, if they differ, the spindle motor can be controlled to adjust the actual rotational speed of the recordable disk upward or downward, as appropriate, to match the predetermined desired speed of the recordable disk.

While this type of feedback system provides a suitable means of ensuring that the recordable disk rotates at the predetermined rotational speed, errors in determining the actual rotational speed of the recordable disk may result if the center of the disk-shaped encoder wheel is not properly aligned with the center of the recordable disk. Specifically, if the center of the disk-shaped encoder wheel is misaligned with the center of the recordable disk, then the speed at which reflective/non-reflective regions of the encoder wheel pass over the photodetector will vary sinusoidally, even though the rotational speed of the recordable disk is constant. This creates a perceived sinusoidal error in the control signal that, if used as a feedback signal in the system, would cause an unintended sinusoidal speed variation of the recordable disk. The present invention was developed in light of these and other drawbacks.

BRIEF DESCRIPTION OF THE DRAWINGS

The present invention will now be described, by way of example, with reference to the accompanying drawings, in which:

FIG. 1 is a schematic view of a first embodiment of a disk drive;

FIG. 1A is a schematic view of a second embodiment of a disk drive;

FIG. 2 is a schematic view of a disk drive according to an embodiment;

FIG. 3 is a schematic view of a disk drive according to an embodiment;

FIG. 4 is a schematic view of a disk drive according to an embodiment; and

FIG. 5 is a schematic view of a control circuit for a disk drive according to an embodiment.

DETAILED DESCRIPTION

An adaptive feedforward circuit is disclosed that corrects the unintended effects of a misalignment of the center of the disk-shaped encoder wheel relative to the center of the recordable disk in a disk drive assembly. The adaptive feedforward circuit accomplishes this correction by incorporating a true oscillation error signal into the system. A true oscillation error signal is a signal input into the system that cancels out a falsely-read error signal such as that caused by, for example, misalignment of the encoder wheel relative to the recordable disk. As the misalignment of the encoder wheel relative to the recordable disk creates a sinusoidal oscillation, the true oscillation error signal provides an opposite oscillation signal to the signal generated by the misalignment of the encoder wheel, which cancels the effects of this misalignment. The true oscillation error signal is generated by using a numerical methods analysis to converge the true oscillation error signal to a value that is equal and opposite to the oscillation signal created by the misalignment of the encoder wheel. Therefore, the system properly determines the difference between the actual rotational speed of the recordable disk and the desired rotational speed of the recordable disk, without experiencing the unintended effects of the misalignment. Thus, the adaptive feedforward circuit helps to provide a more robust system for maintaining a constant rotational speed of the recordable disk.

Referring now to FIGS. 1 and 2, a disk drive 10 is shown according to an embodiment. The general construction of the disk drive 10 includes recordable disk 12 coupled to spindle motor 18 by spindle shaft 16. The spindle motor 18 provides rotational energy to the recordable disk 12 to rotate the recordable disk 12 for reading and writing computer operations, as will generally be understood by one skilled in the art.

Encoder wheel 14 may be a disk-shaped device configured to rotate at the same rate of speed as the recordable disk 12. Encoder wheel 14 is shown in FIG. 1 as a separate and distinct disk that is attached to spindle shaft 16 so that it rotates at the same speed as recordable disk 12. As shown in FIG. 2, the encoder wheel 14 includes a plurality of reflective regions 26 and non-reflective regions 28. The reflective regions 26 are constructed to reflect light while the non-reflective regions are constructed so that light does not reflect, or, alternatively, so that the amount of reflection is limited. Light source 20 (see FIG. 1) is positioned to project light at the encoder wheel 14 such that it traces out light path 30 (as shown in FIG. 2) across reflective regions 26 and non-reflective regions 28. As shown in FIG. 1, photodetector 22 is positioned to receive light that is reflected back from the encoder wheel 14. As will be generally understood from FIGS. 1 and 2, the photodetector 22 will receive light from the encoder wheel 14 when the light source 20 projects light onto the reflective regions 26, but will receive a relatively small amount of reflected light (approaching no reflected light) when the light source 20 projects light onto the non-reflective regions 28. The photodetector 22 provides a signal to control circuit 24 indicative of the amount of reflected light detected. Based on the photodetector signal, control circuit 24 generates a feed-back voltage signal to the spindle motor 18, as will be described in greater detail hereinafter, which is used to adjust the speed of the recordable disk 12 so that it rotates at the desired rotational speed.

Figure 1:
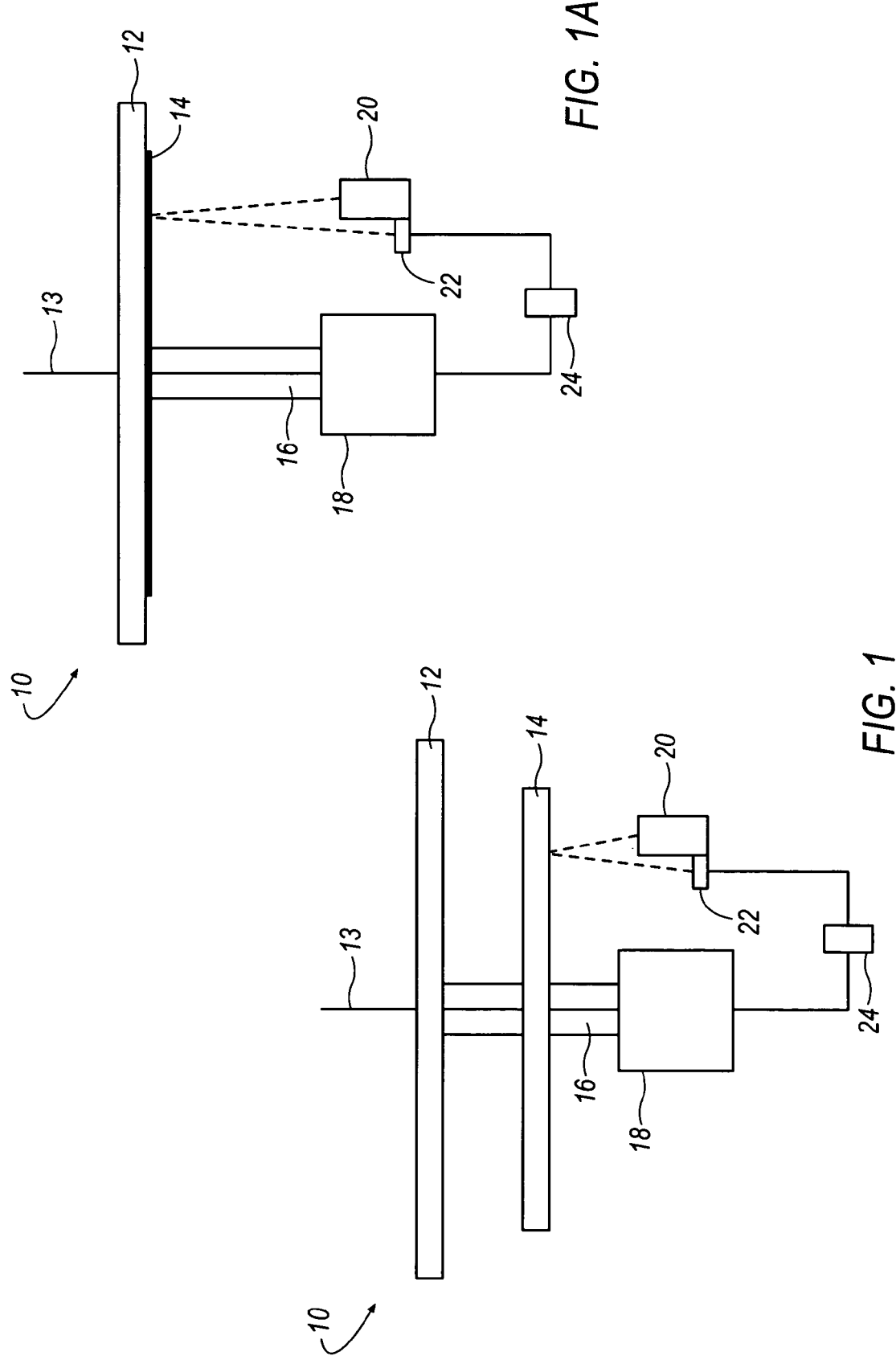
Figure 2:
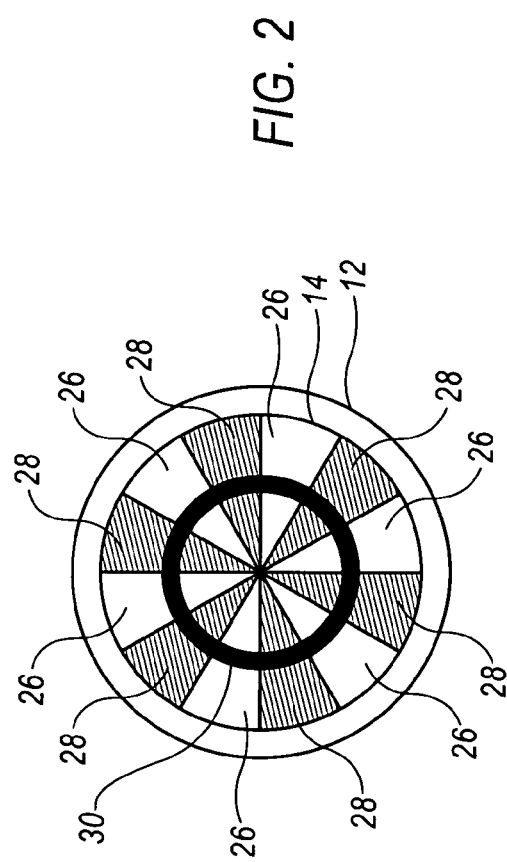

In another embodiment of the disk drive, encoder wheel 14 may be attached directly to or made integral with recordable disk 12, as shown in FIG. 1A (where like elements have like references relative to FIG. 1). In such instances, the reflective and non-reflective regions 26 and 28 (FIG. 2) may be screen-printed onto surface of the recordable disk 12 or they may be embossed into the plastic surfaces of the recordable disk, for example. Other methods and configurations for causing the encoder wheel 14 rotate at the same speed as the recordable disk 12 will be known to those skilled in the art.

The speed of rotation of the encoder wheel 14, and therefore the recordable disk 12 (which is the same), can be determined by measuring the amount of time that the photodetector 22 receives reflected light and the amount of time that the photodetector 22 does not receive reflected light. In some embodiments, the photodetector signal is compared to one or more reference values to determine if the light source is shining on a reflective region or a non-reflective region of the encoder wheel 14. If the photodetector signal is indicative of an amount of reflected light that falls below a reference value, then it may be determined that the light source is shining on a non-reflective region, whereas, if the photodetector signal is indicative of an amount of reflected light that is greater than a reference value (which may be different from the first reference value), then it may be determined that the light source is shining on a reflective region. Alternatively, in some embodiments, the photodetector 22 may be configured to provide a binary "present" or "absent" signal indicating the presence or absence of received light.

Figure 4:
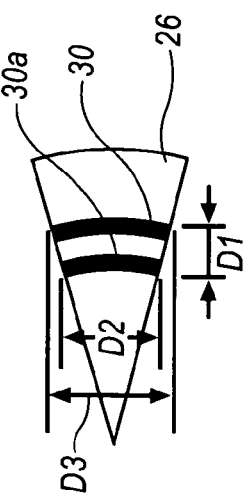

As shown in FIG. 4, the amount of time that photodetector 22 detects the light path 30 across the reflective region 26 can be used to calculate the rotational speed of the encoder wheel 14 and therefore the recordable disk 12 by simple physics. By knowing the radial distance of the light path 30, the arc length of the light path 30, and the amount of time that the photodetector 22 receives reflected light from reflective region 26 before non-reflective region 28 comes into the path of the light source 20, the rotational speed of the encoder wheel 14 and therefore the recordable disk 12 can be determined. The methods for determining such rotational speed will be readily understood by one skilled in the art.

Figure 3:
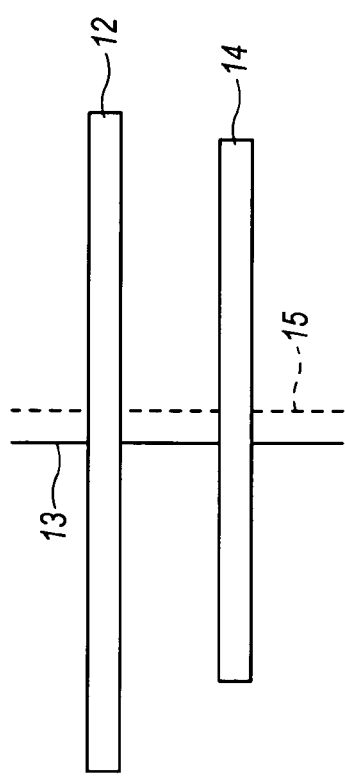

In FIG. 3, a situation is shown where the encoder wheel 14 is attached to spindle 13 such that the encoder wheel 14 has a different center of rotation than the recordable disk 12. If the encoder wheel 14 is directly attached to or integral with recordable disk 12 (as shown in FIG. 1A), then the respective centers of rotation may be misaligned when the encoder wheel 14 is attached or applied to the recordable disk 12. In any event, as shown in FIG. 3, recordable disk 12 has a center of rotation 13 while encoder wheel 14 has an off-center of rotation 15, which causes the encoder wheel 14 to sinusoidally oscillate with respect to light source 20 and photodetector 22. More specifically, as shown in FIG. 4, when the encoder wheel 14 is at an arbitrary zero degree position of rotation, the light path along any one of the reflective regions 26 or non-reflective regions 28 (for purposes of example, reflective regions 26 is used in FIG. 4) is shown as light path 30. When the encoder wheel 14 rotates through a position of 180°, the off-center axis 15 moves the encoder wheel 14 such that the light path is shown as light path 30a. As a result, the light path 30 shifts from 30 to 30a, which is a total distance of D1. Therefore, the total distance the reflective regions 26 must move is longer (distance of D3) when the encoder wheel 14 is at the zero degree position, as opposed to when it is at the 180 degree position (D2). When calculating rotational speed, this difference in light path length results in a different calculation of the rotational speed of the encoder wheel 14 and therefore the recordable disk 12. When the recordable disk 12 rotates, this change is sinusoidal. Therefore, the error caused by this movement is also sinusoidal.

To compensate for this difference in calculated rotational speed, the present embodiment injects a true oscillation error signal into an error correction mechanism of the control circuit 24. This true oscillation error signal is opposite of the error caused misalignment of the encoder wheel 14 to thereby cancel the effects of the off-center positioning of the encoder wheel 14. This true oscillation error signal is the sum of a sine and cosine wave at the frequencies of the speed of rotation of the disk as follows:

{true oscillation error signal}=$A1 \cdot QS1 + B1 \cdot QC1$    Equation 1

In equation 1, A1 is a sine Fourier coefficient and B1 is a cosine Fourier coefficient. QS1 and QC1 are the signals generated by sine and cosine generators respectively. One skilled in the art will recognize that QS1 and QC1 could be generated by using the same sine or cosine function and shifting the respective phases so that QS1 and QC1 (whether generated from sine or cosine functions) are 90 degrees out of phase with each other. The signals generated by the sine and cosine generators merely represent un-scaled sinusoidal signals. The Fourier coefficients are used in conjunction with the signals from the sine and cosine generators QS1 and QC1 to provide an oscillation signal having specific desired characteristics according to the Fourier coefficients as will readily be understood by one skilled in the art. The Fourier coefficients are chosen such that the true oscillation error signal will cancel out the unintended oscillation signal caused by misalignment of the encoder wheel 14. The process for arriving at the correct Fourier coefficients will be discussed in greater detail below.

Figure 5:
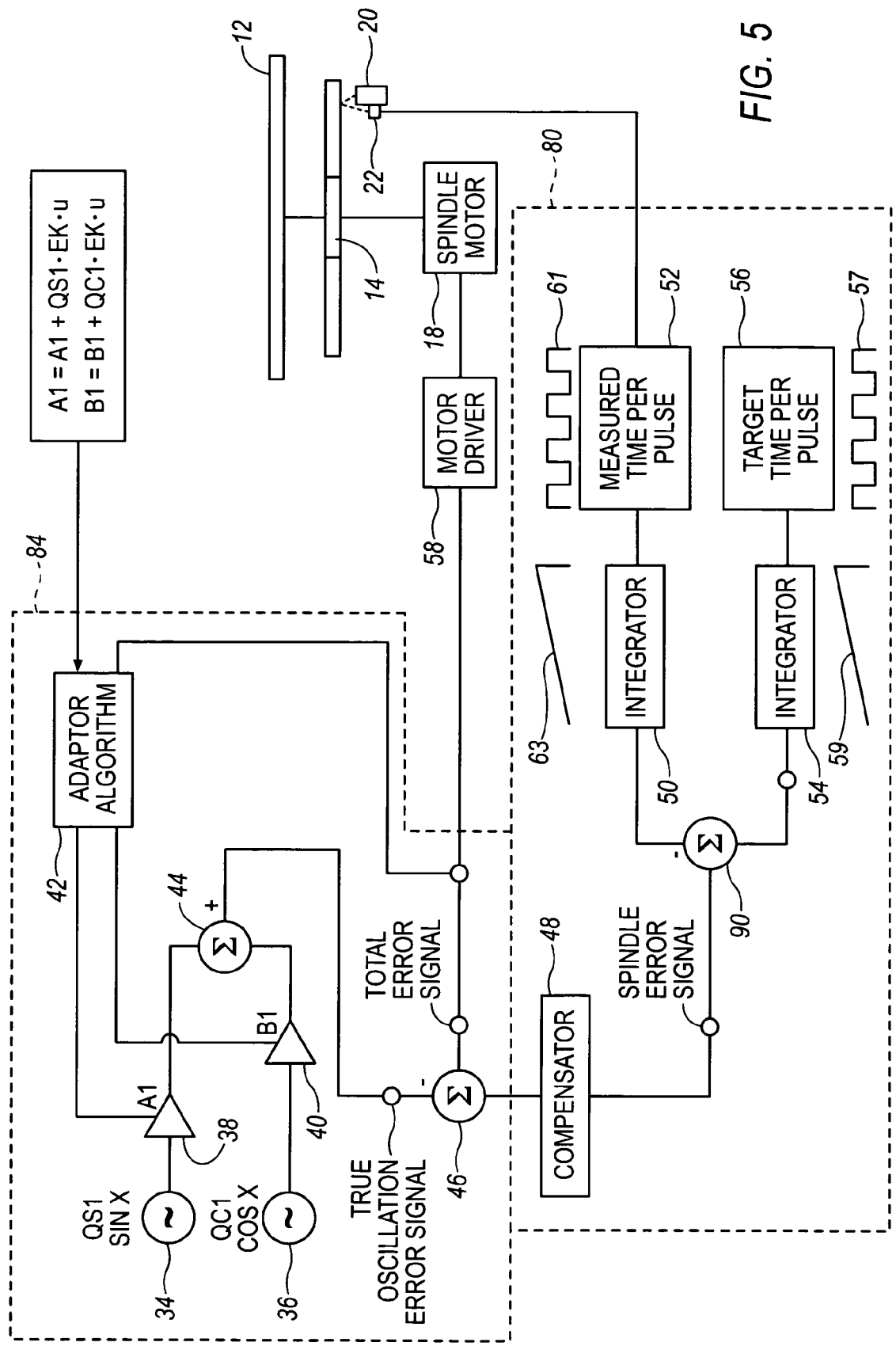

Referring now to FIG. 5, the control circuit 24 for driving the spindle motor 18 to compensate for the difference between disk center 13 and encoder center 15, as well as ensuring that the spindle motor 18 rotates the recordable disk 12 at the desired rotational speed is described in greater detail. The control circuit 24 generally includes actual error calculation portion 80 and sinusoidal error correction portion 84.

Error calculation portion 80 determines the difference between the desired rotational speed of recordable disk 12 and the actual speed at which it is rotated. To accomplish this determination, error calculation portion 80 includes a target time per pulse block 56 and an integrator 54. The target time of the target time per pulse block 56 represents the desired time that should pass between one rising edge of an encoder output and when the next rising edge occurs. A rising edge is when a reflective portion of the encoder wheel comes into view of the photodetector 22 or when a non-reflective portion of the encoder wheel exits from view. The actual time between rising edges is measured by the measured time per pulse block 52 as each pulse arrives from the photodetector 22. The pulses from the measured time per pulse block 52 and target time per pulse block 56 are represented by waves 57 and 61. As the recordable disk 12 rotates, the actual time between encoder wheel pulses is integrated by integrator 50, and the target time is integrated by integrator 54 to accumulate total elapsed times. The total elapsed times are with respect to a reference angle of the disk, called the 0 degree angle. At the 0 degree angle point of rotation, both the ideal and actual total elapsed times are zeroed and the integration begins again.

As each pulse occurs, the accumulated results output from integrators 50 and 54 increases by the amount of time that has elapsed since the last pulse, as is the case in the measured time per pulse path, or the target time per pulse path. This accumulation increases steadily until it is zeroed at the 0 degree angle position. Thus, the accumulated times appear as sawtooth forms or built waves 63 or 59, whose frequency is that of the spindle rotating one revolution or 360 degrees once-around.

The summing device 90 subtracts the built wave 63 from the built wave 59 to arrive at a spindle error signal, which represents the difference between the desired rotational speed and the actual rotational speed of the recordable disk. The spindle error signal is fed to a compensator 48 which can be any closed loop compensator such as a Proportional Integral Differentail (PID) or phase lead compensator, as will be readily understood by one skilled of the art. The spindle error signal represents the difference between the actual disk rotation determined by the photodetector 22, and the measured time per pulse block 52 and the desired disk rotation as generated by target time per pulse block 56. This value, however, does not compensate for the unintended sinusoidal offset created by the distance between disk center 13 and encoder wheel center 15.

To compensate for the distance between disk center 13 and encoder wheel center 15, Equation 1 (described above for calculating the true oscillation error signal) is used by sinusoidal error correction circuit 84 to create a total error signal. Here, sine generator 34 generates a sine wave to provide QS1 in Equation 1. Cosine generator 36 similarly generates a cosine wave to provide QC1 in Equation 1. These two signals are respectively sent to multiplier 38 and multiplier 40, which multiply these waves by the Fourier coefficients A1 and B1 respectively. The resulting values from multiplier 38 and multiplier 40 are then summed by summation device 44 to generate a true oscillation error signal.

Summing device 46 causes the output of summation device 44 to be subtracted from the spindle error signal (after it passes through compensator 48). The result is a total error signal, which is provided to the motor driver 58. The motor driver 58 converts this signal into a voltage, such as through a digital to analog converter DAC (not shown), to drive the spindle motor 18 at the desired speed to obtain the desired rotational speed of the recordable disk 12. It should be noted, however, that the output of the summation device 44 can be subtracted from the spindle error signal before it passes through the compensator 48. In such an instance, the compensator 48 would be located along the total error signal in FIG. 5.

The Fourier coefficients A1 and B1 are provided by the adapter algorithm 42, which uses an adaptive algorithm to arrive at the correct values for the Fourier coefficients A1 and B1 as will be discussed in greater detail below. Theoretically, if the Fourier coefficients A1 and B1 are correctly chosen, the resulting true oscillation error signal of Equation 1 will cancel the sinusoidal error arising from misalignment of the encoder wheel 14. To obtain the correct Fourier coefficients, an adaptive algorithm is applied in conjunction with equation 1 to arrive at the correct Fourier coefficients A1 and B1.

The adaptive algorithm is used to arrive at the correct Fourier coefficients. The adaptive algorithm is used to converge initial Fourier coefficients A1 and B1 and therefore an initial true oscillation error signal from initial arbitrary starting values to end values. The starting values of the Fourier coefficients are any arbitrary values that do not necessarily cancel the effects of the off-center attachment of the encoder wheel 14. The end value after the adaptive algorithm has been completed provides an equation for generating a signal that is opposite of the unintended oscillation frequency generated by the misalignment of the encoder wheel 14. This adaptive algorithm may be similar to the LMS (least mean squared) algorithm, which is well known to those familiar with the art. and use a feedback mechanism to arrive at values for A1 and B1.

The present embodiments utilize this adaptive algorithm to arrive at Fourier coefficients that combine with the signals provided by the sine and cosine generators 34 and 36 to result in an oscillation signal that is opposite to the oscillation signal created by the misalignment of the encoder wheel 14. Through an iterative process, the Fourier coefficients A1 and B1 converge on the correct values that cause Equation 1 to generate an oscillation signal that is equal and opposite to the unintended oscillation signal caused by the misalignment of the encoder wheel 14. The adaptive algorithms adjusts the Fourier coefficients using the following algorithm, which is similar in nature to a Least Mean Squared algorithm as will be generally understood by one skilled in the art:

$$A1 = A1 + Ek * QS1 * u \quad \text{Equation 2}$$

$$B1 = B1 + Ek * QC1 * u \quad \text{Equation 3}$$

where u is an adaptation coefficient that controls how quickly the coefficients converge to their final value, and also their final accuracy.

The total error signal is substituted for Ek in Equations 2 and 3 as a feedback signal. As shown in equations 2 and 3, Ek is multiplied by the adaptation coefficient u, which for example can be 0.25, and is then multiplied by the cosine and sine signals from the generators 34 and 36 as described above, and these results are then added to the Fourier coefficients A1 and B1. This process produces improved Fourier coefficients which yields a new true oscillation error signal for summing with the summation device 44 to generate a new total error signal. As iteration after iteration of the above-described process is performed, the Equations 2 and 3 converge on values for the Fourier coefficients A1 and B1 that yield the true oscillation error signal of Equation 1 that is sufficient to offset the unintended error signal caused by the misalignment. In practice, A1 and B1 can be initialized to 0, and, with sufficient iterations, A1 and B1 will converge to values that cause cancellation of the misalignment error that is embedded in the spindle error signal, thus preventing this unintended error from causing the rotational speed of the recordable disk to vary sinusoidally.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. An error correction circuit for determining an error in rotational speed of a recordable disk of a disk drive, comprising:
   a sinusoidal error calculation portion adapted to generate a true oscillation error signal; and
   a summation portion adapted to combine the true oscillation error signal with a spindle error signal to generate a total error signal;
   wherein the sinusoidal error calculation portion is adapted to generate a new true oscillation error signal based on the total error signal.

2. The error correction circuit according to claim 1, further comprising:
   an actual error calculation portion adapted to:
      generate a target rotational speed of the recordable disk;
      determine an actual rotational speed of the recordable disk; and
      determine the spindle error signal based on the target rotational speed and the actual rotational speed of the recordable disk.

3. The error correction circuit according to claim 2, wherein the actual error calculation portion further comprises:
   a target time circuit that generates a desired rotational speed signal for the recordable disk;
   a target time integrator that integrates the desired rotational speed signal over a revolution of the recordable disk to generate a target rotational speed of the recordable disk;
   a measured time circuit adapted to generate a measured time signal over a revolution of the recordable disk based on a measured rotational speed of the recordable disk;
   a measured time integrator that integrates the measured time signal to determine an actual rotational speed of the recordable disk; and
   an actual error calculation summation circuit that subtracts the target rotational speed of the recordable disk from the actual rotational speed of the recordable disk to determine the spindle error signal.

4. The error correction circuit according to claim 3, wherein the measured time circuit generates the measured time signal from information received from a photodetector.

5. The error correction circuit according to claim 1, further configured to provide the total error signal to a disk drive control mechanism to adjust rotational speed of the recordable disk.

6. The error correction circuit according to claim 1, wherein the sinusoidal error calculation portion further comprises:
   a first sinusoidal signal generator adapted to generate a first sinusoidal signal;
   a second sinusoidal signal generator adapted to generate a second sinusoidal signal having a different phase from the first sinusoidal signal;
   an adapter algorithm circuit adapted to multiply the first sinusoidal signal and the second sinusoidal signal by a feedback factor based on the total error signal to generate the new true oscillation error signal; and
   a sinusoidal summation portion adapted to sum the multiplied first sinusoidal signal and the second multiplied sinusoidal signal.

7. The error correction circuit according to claim 6, wherein the first sinusoidal signal generator is a sine signal generator and the second sinusoidal signal generator is a cosine signal generator.

8. The error correction circuit according to claim 6, wherein the feedback factor is the total error signal.

9. The error correction circuit according to claim 8, wherein:
   the adapter algorithm circuit is adapted to multiply the first sinusoidal signal and the second sinusoidal signal by an adaptation coefficient.

10. The error correction circuit according to claim 1, wherein the summation portion is adapted to combine the new true oscillation error signal with the spindle error signal to generate a new total error signal.

11. The error correction circuit according to claim 10, further configured to provide the new total error signal to a disk drive control mechanism to adjust rotational speed of the recordable disk.

12. A disk drive, comprising:
   a recordable disk;
   an encoder wheel having reflective and non-reflective portions configured to rotate at the same rate of speed as the recordable disk;
   a light source adapted to project light onto the encoder wheel;
   a photodetector adapted to receive reflected light from the encoder wheel and generate a photodetector signal based thereon; and
   a control circuit, responsive to the photodetector signal, that generates a control signal used to adjust the rotational speed of the recordable disk, the control circuit comprising:
      a sinusoidal error correction portion adapted to generate a true oscillation error signal;
      a summation portion adapted to combine the true oscillation error signal with a spindle error signal to generate a total error signal; and
      wherein the sinusoidal error calculation portion is adapted to generate a new true oscillation error signal based on the total error signal.

13. The disk drive according to claim 12, wherein said encoder wheel is distinct from the recordable disk, and wherein the recordable disk and the encoder wheel are both mounted to a spindle shaft that is driven by a spindle motor.

14. The disk drive according to claim 12, wherein the encoder wheel is disposed directly on said recordable disk.

15. The disk drive according to claim 12, wherein said encoder wheel is integrally formed into said recordable disk.

16. The disk drive according to claim 12, wherein the error correction circuit further comprises:
   an actual error calculation portion adapted to:
      generate a target rotational speed of the recordable disk;
      determine an actual rotational speed of the recordable disk based on the photodetector signal; and
      determine the spindle error signal based on the target rotational speed and the actual rotational speed of the recordable disk.

17. The disk drive according to claim 16, wherein:
the photodetector receives a first level of reflected light when the light source illuminates the reflective regions;
the photodetector receives a second level of reflected light when the light source illuminates the non-reflective regions; and
the actual error calculation portion generates the actual rotational speed based on elapsed time between when the photodetector receives the first level of light and the second level of light.

18. The disk drive according to claim 17, wherein the second level of light is approximately no light.

19. The disk drive according to claim 17, wherein the second level of light is below a predetermined threshold level.

20. The disk drive according to claim 12, wherein the actual error calculation portion further comprises:
a target time circuit that generates a desired rotational speed signal for the recordable disk;
a target time integrator that integrates the desired rotational speed signal over a revolution of the recordable disk to generate the target rotational speed of the recordable disk;
a measured time circuit adapted to generate a measured time signal over a revolution of the recordable disk based on a measured rotational speed of the recordable disk;
a measured time integrator that integrates the measured time signal to determine an actual rotational speed of the recordable disk; and
an error calculation summation circuit that compares the target rotational speed of the recordable disk from the actual rotational speed of the recordable disk to determine the spindle error signal.

21. The disk drive according to claim 12, wherein the sinusoidal error calculation portion further comprises:
a first sinusoidal signal generator adapted to generate a first sinusoidal signal;
a second sinusoidal signal generator adapted to generate a second sinusoidal signal that has a different phase than the first sinusoidal signal;
an adapter algorithm circuit adapted to multiply the first sinusoidal signal and the second sinusoidal signal by a feedback factor based on the total error signal to generate the new true oscillation error signal; and
a sinusoidal summation portion adapted to sum the first multiplied sinusoidal signal and the second multiplied sinusoidal signal.

22. The disk drive according to claim 21, wherein the first sinusoidal signal generator is a sine signal generator, and the second sinusoidal signal generator is a cosine signal generator.

23. The disk drive according to claim 21, wherein the adapter algorithm circuit is adapted to multiply the first sinusoidal signal and the second sinusoidal signal by the total error signal.

24. The disk drive according to claim 23, wherein the adapter algorithm circuit is adapted to multiply the first sinusoidal signal and the second sinusoidal signal by an adaptation coefficient.

25. The disk drive according to claim 12, wherein the summation portion is adapted to combine the new true oscillation error signal with the spindle error signal to generate a new total error signal.

26. The disk drive according to claim 25, wherein a motor drive circuit is adapted to drive a spindle motor at a rotational speed based on the new total error signal.

27. A method for determining an error in a rotational speed of the recordable disk in a disk drive assembly, comprising:
generating a true oscillation error signal;
determining an actual rotational speed of the recordable disk;
determining a target rotational speed of the recordable disk;
combining the target rotational speed of the recordable disk with the actual rotational speed of the recordable disk to determine a spindle error signal; and
combining the spindle error signal with the true oscillation error signal to determine a total error signal.

28. The method according to claim 27, further comprising driving the recordable disk at a rotational speed based on the total error signal.

29. The method according to claim 27, wherein the step of generating a true oscillation error signal further comprises:
generating a first sinusoidal signal;
generating a second sinusoidal signal having a different phase than the first sinusoidal signal;
multiplying the first sinusoidal signal and the second sinusoidal function by a feedback factor to obtain a multiplied first sinusoidal signal and a second multiplied sinusoidal signal; and
adding the first multiplied sinusoidal signal to the second multiplied sinusoidal signal to obtain the true oscillation error signal.

30. The method of claim 29, wherein said first sinusoidal signal is a sine wave signal, and the second sinusoidal signal is a cosine wave signal.

31. The method according to claim 29, further comprising the step of multiplying the first sinusoidal signal and the second sinusoidal signal by an adaptation coefficient.

32. The method of claim 27, further comprising the step of generating a new true oscillation error signal based on the total error signal.

33. The method according to claim 27, further comprising driving a recordable disk based on the total error signal.

34. An error correction circuit for determining an error in rotational speed of a recordable disk of a disk drive, comprising:
means for generating a true oscillation error signal;
means for providing a spindle error signal; and
means for combining the true oscillation error signal with the spindle error signal to generate a total error signal.

35. The error correction circuit according to claim 34, wherein the means for generating the true oscillation error signal further comprises:
a sine signal generator means for generating a sine signal;
a cosine signal generator means for generating a cosine signal;
an adapter algorithm means for multiplying the sine signal and the cosine signal by a feedback factor based on the total error signal to generate a new true oscillation error signal; and
a sinusoidal summation means for summing the multiplied sine signal and the multiplied cosine signal.

36. The error correction circuit according to claim 35, wherein the feedback factor is the total error signal.

37. The error correction circuit according to claim 36, wherein the adapter algorithm means is for multiplying the sine signal and the cosine signal by an adaptation coefficient.

* * * * *